Sept. 23, 1969        E. F. WELCH        3,468,169
QUICK RELEASE COUPLING
Filed Jan. 26, 1968
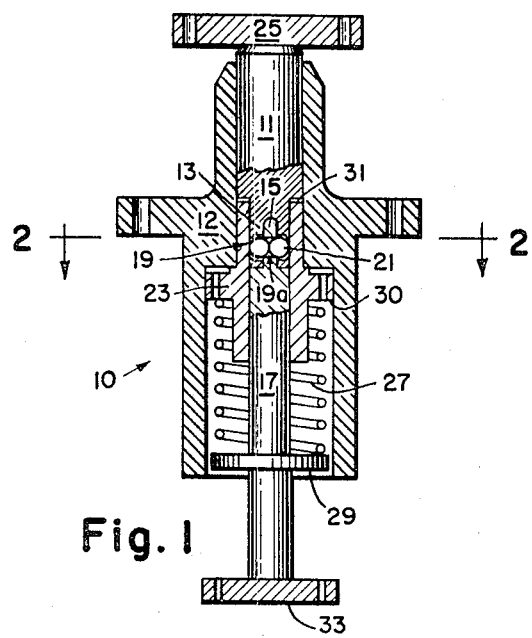
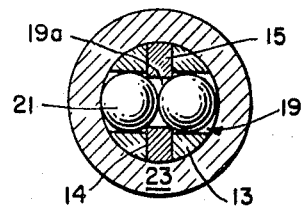
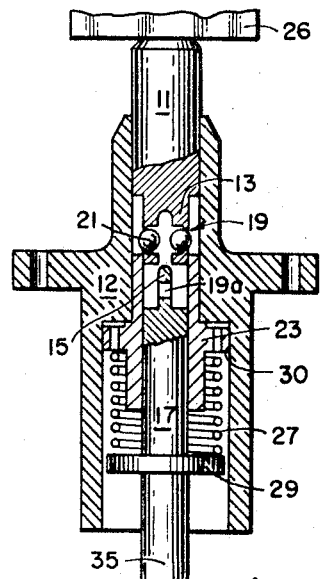
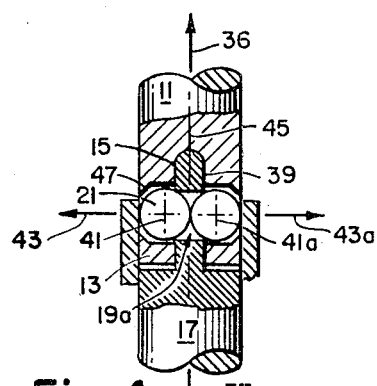
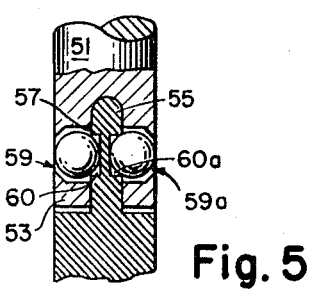
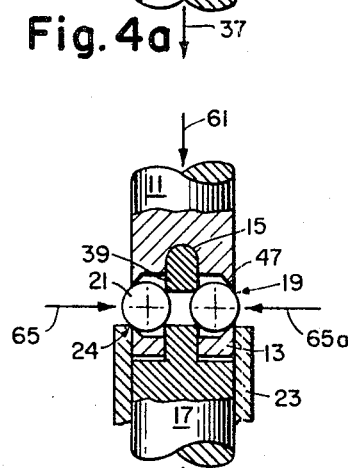
Edmund F. Welch
*INVENTOR.*

United States Patent Office 3,468,169
Patented Sept. 23, 1969

3,468,169
QUICK RELEASE COUPLING
Edmund F. Welch, Kansas City, Mo., assignor to the United States of America as represented by the United States Atomic Energy Commission
Filed Jan. 26, 1968, Ser. No. 701,008
Int. Cl. F16d 1/10
U.S. Cl. 74—2                                      3 Claims

ABSTRACT OF THE DISCLOSURE

A coupling for transmitting rotary and longitudinal movement between separable aligned members having overlapping end portions in combination with one or more locking members disposed in passageways within said end portions, a retaining means for maintaining the locking members in locking disposition with the end portions, and means to release the locking members for quick and forceful separation of the aligned members.

BACKGROUND OF INVENTION

There are many applications where it may be desirable to provide a quick disconnect coupling which can transmit both longitudinal and rotary motion through the joint or coupling members. Such applications may include drive shafts between a drive mechanism and pumps or fans or some other rotary device as well as valves, connectors or separators for rockets, missiles or other aerospace devices where quick uncoupling may be desirable. By spring loading or suitably biasing a mechanism of this type, a hammer or hammerlike mechanism may be forcibly driven against a desired device to perform some function, such as a firing pin for striking a detonator. Locks or latches on doors and safes may also be engaged by such a device which may conveniently be separated for security purposes. Prior devices having quick coupling and uncoupling features have been subject to jamming upon attempted release and have lacked facility to transmit rotary motion without placing unduly large stress on the locking mechanism in the coupling as well as the coupling itself.

SUMMARY OF INVENTION

In view of the limitations of the prior art such as noted above, it is an object of this invention to provide a reliable quick release and reconnect coupling.

It is a further object of this invention to provide a quick release and reconnect coupling with both longitudinal force and torque transmission capability.

It is a further object to provide a quick release coupling which recoils on release and may be used to propel an impact providing device.

Further objects and advantages will become apparent from the following description of one embodiment of the invention.

As shown, the invention comprises a quick release and reconnect coupling having both longitudinal force and torque transmission capability including a joint having a tongue and a groove portion locked together by locking or detent members occupying a transverse passageway within the joint, a retaining collar or detent retainer aligned with and occluding the passageway to maintain the locking members in engagement with both portions of the joint, and yieldable means for maintaining the retaining collar and passageway in alignment and propelling the joint portions apart on disengagement of the locking members therefrom.

DESCRIPTION OF DRAWINGS

The present invention is illustrated in the following drawings wherein:

FIG. 1 is an elevation view partially in cross section of a quick release coupling device.

FIG. 2 is an enlarged cross-sectional fragmentary view of FIG. 1 along line 2—2.

FIG. 3 is the device of FIG. 1, with modifications, after uncoupling.

FIG. 4a is a fragmentary cross-sectional view showing a portion of the device in FIG. 1 with uncoupling forces diagrammatically represented.

FIG. 4b is a fragmentary cross-sectional view similar to FIG. 4a showing diagrammatically the recoupling forces acting thereon.

FIG. 5 is a fragmentary cross-sectional view of a modified embodiment of the device shown in FIG. 1.

DETAILED DESCRIPTION

In FIGS. 1, 2, and 3 various embodiments of a quick release mechanism or coupling device 10 are shown in both the latched and unlatched positions supported within a suitable frame or housing 12. Housing 12 may take any suitable form such as a drive or pump housing, depending on the particular application of the coupling.

Coupling 10 may include a first shank or shaft member or section 11 having a groove or offset portion 13 at one end thereof and a suitable means for engagement and utilization such as a flange 25 (FIG. 1) or a handle or grip 26 (FIG. 3) at the opposite end. Groove portion 13 of shank section 11 may engage or overlap with a projection or tongue portion 15 at one end of a second shank or shaft secton or member 17 to form a tongue and groove type joint having noncircular overlapping surfaces capable of transmitting rotational force or motion from one shank section to the other. As shown the tongue and groove portions may have nearly identical snug fitting cross sections, but if desired variations in size and shape may be introduced such as a tongue having a V-shaped or pointed cross section at the tip thereof engaging a groove with a rounded end or bottom. The end of shank 17 opposite the groove portion may be provided with a suitable connection or utilization device such as flange or coupling member 33 (FIG, 1) or an impact means 35 (FIG. 3) such as a hammer type device or firing pin. Although the groove portion 13 has been described and shown as a part of or connected to shank section 11 with its corresponding utilization embodiments, and the tongue portion 15 has been affixed to or integral with shank section 17, it will be clear that this arrangement may be altered or reversed such that shank section 17 may have a groove portion while shank section 11 may be provided with a tongue portion without substantially affecting the performance of the coupling device. It should further be noted that although a tongue and groove type joint has been shown that other arrangements, such as any suitable pair of longitudinally aligned members with noncircular overlapping abutting portions which may not rotate in respect to each other, may be used as a joint in the present invention.

A laterally extending passageway or bore 19 may be provided through the groove portion 13 and aligned with a similar passageway 19a through the tongue portion 15. To prevent withdrawal of tongue portion 15 from groove portion 13 and allow transmission of longitudinal force or motion during normal operation of the coupling, the passageways 19 and 19a may be occupied by one or more detent or locking members 21 each of which in the latched position may overlap into both passageways. Locking members 21 and passageways 19 and 19a may be sized so that the members may be laterally rolled or tumbled along the passageways, but a snug or close fit may be desirable to prevent random translation of members 21 within the passageways with possible premature release or uncoupling of the joint. For instance two spherical or cylindrical locking members may satisfactorily fit within passageways having a combined length through both the tongue and groove portions of about twice the diameter of a locking member and having a passageway diameter or height at least through the groove portion about equal to or slightly more than the diameter of a single locking member. The locking members may have a generally arcuate or multisided shape such as a generally spherical, cylindrical, spheroidal or polygonal which may readily be rolled, tumbled or cammed along the passageways. A spherical detent or locking member as shown may more readily roll or move in any direction and may be less likely to jam or wedge in or between the passageways.

A suitable retaining ring or collar 23 fixed or formed within housing 12 may be slideably engaged and alignable with shank sections 11 and 17 so as to close or overlie the extremities of passageway 19. The collar 23 may thus retain the locking members 21 within both of the passageways in locking disposition with both the tongue and groove portions of the shank sections to prevent uncoupling or release of the joint. The interengaging or interfacial surfaces between retaining collar 23 and shanks 17 and 11 may have an arcuate or cylindrical configuration, as shown in FIG. 2 to allow the shank sections to revolve as well as slide longitudinally on the inside surfaces of collar 23. If desired the detent members used with such a configuration may be arranged to function as bearings between the shanks 17 and 11 and retaining collar 23. Alternatively, the interfacial surfaces of the shank sections and retaining collar may be of an interlocking or keyed configuration, such as for example interfitting rectangular cross sections or circular interfitting shafts provided with an interengaging key, which would allow the retaining collar 23 if released from housing 12 to serve as a coupling transmitting rotational movement and torque between the shank sections.

As shown, the shank sections may be longitudinally slid beyond or rotated within the collar 23 by applying a longitudinal force or torque to handle 26 or flange 25 such that the extremities of passageways 19 may be translated beyond the retaining collar 23 or to an open portion therein (not shown) allowing the detent or locking members to roll or tumble into an unlatched position remote or separated from passageway 19a of tongue portion 15. As a modification, shank sections 17 and 11 may be fixed to stationary apparatus at flanges 25 and 33, but retaining collar 23 may be free from housing 12 and slidable along or around the shanks to open the extremities of passageway 19 so that the detent members may move to the unlatched position.

Yieldable means 27 shown as a compression spring intermediate shoulder or flange 29 and flange 30 of retaining collar 23 may oppose any outward longitudinal force applied to shank 11. Other suitable spring types such as a tension or leaf spring may be appropriately attached to shank 17 to provide a bias when shank movement deforms the spring. The spring may normally be maintained in a relaxed position to minimize spring force weakening during storage or nonuse such that substantially full spring strength may be provided on deformation. Other types of a yieldable or bias means 27 may include pneumatic or hydraulic devices, gravity, or friction.

Yieldable means 27 acting on shank section 17 in cooperation with the longitudinal force and movement applied to shank section 11 may, as will be further explained below, force and propel the locking members outwardly into the unlatched position when the passageway 19 is disposed beyond or to an open portion of retaining collar 23 and may propel the two shank sections apart as shown in FIG. 3. It should be noted than an outwardly longitudinal force exerted by a load or loads attached to shank section 17 at flange 33 may be borne at a suitable offset in the coupling components such as at interface 31 intermediate an enlarged portion of shank section 11 and a lateral surface of retaining collar 23 which may be suitably secured to housing 12. Thus, such a load attached at flange 33 need not uncouple the tongue and groove joint.

Rotary motion or torque may be transmitted from one shank section to another without appreciably stressing the locking members latching the joint together since the tongue and groove portions are the primary force transmitters. For instance if the load affixed to flange 33 is rotated by turning flange 25, torque may be transferred directly from groove 13 to tongue 15 (see FIG. 2) at the tongue to groove noncircular interface or surface 14 intermediate the shank periphery and the passageway 19. Furthermore, by providing a coupling type retaining collar having noncircular or interlocking interfacial surfaces communicating with the surfaces of the shank sections as described above, additional torsional support protecting against stress may be gained for the locking members.

As noted above, an impact means 33 such as a hammer, striker, or firing pin may be formed or attached to the remote end of shank 17 and may be propelled by the recoil of yieldable means or spring 27 into a detonation cap, cartridge, or other utilization device requiring impact (not shown). A further embodiment may include a device attachable adjacent an automobile window glass at a suitable location such that the glass would be exposed to and in range of the impact means for all window positions. Should the automobile become submerged in water, the device could be uncoupled to release the impact means propelled by spring recoil or other suitable bias into the window glass which should shatter and collapse allowing the occupant to escape.

The enlarged fragmentary views in FIGS. 4a and 4b show forces which may operate on the tongue and groove joint during release and reassembly. In FIG. 4a force 36 exerted on shank 11 may be resisted by force 37 produced by yieldable means 27 acting on shank section 17. Force 37 may bring the edges 39 of tongue portion 15 and passageway 19a to bear in a skewed or off centered relationship on detent members 21 at points extending to or into passageway 19a (i.e., intermediate the longitudinal axis 45 of the shank sections and the members' centerlines or axes 41 and 41a drawn parallel thereto). Outwardly transverse forces 43 and 43a may be transmitted to detent members 21 through their camlike engagement with edges 39. Forces 43 and 43a will urge separation of locking members 21 which may unlatch or disengage from the tongue portion 15 to release shank section 17 as soon as the openings of passageway 19 are moved out of registry with the retaining portion of collar 23 (see FIG. 3).

To insure that edges 39 contact the locking members 21 at suitable locations to produce outwardly transverse forces such as 43 and 43a, various structural techniques may be utilized. The tongue portion 15 may be generally centered lengthwise along the passageway 19 and groove portion 13 and the total length of the passageway 19a passing through the tongue portion may be less than the diameter of a locking member 21 to prevent tongue portion contact outside or on the locking members' centerline 41 and 41a. Also, the diameter or height of the passageway 19a through the tongue portion 15 may be slightly less than the diameter of the locking members 21 to limit its travel into the tongue portion.

Reassembly may be achieved as shown in FIG. 4b, in a manner similar to the uncoupling operation. To facilitate reassembly, a constriction 47, having a diameter less than that of the locking member 21, may be provided in the passageway 19 at the outer surface of shank section 11 to prevent complete escape of the locking members during and after uncoupling. The constriction 47 may be a suitable insert or collar or merely a portion of shank section 11 which has been deformed with a punch or press or by peening to partially close the end of passageway 19. Compressive forces 61 and 63 may be longitudinally applied to shank sections 11 and 17 engaging the tongue and groove joint portions and advancing them towards the retaining collar 23. The locking members may contact the advanced edge 24 of retaining collar 23 in a skewed or off centered relationship at points extending to or beyond the external lateral surfaces of the shank section 11 to produce inwardly transverse forces 65 and 65a which move, tumble, or roll the locking member into the latched position similar to the action of edges 39 described above. The reassembly action of the coupling may be further modified by removing an inside portion of edge 24 to form an inwardly facing slope which will make first contact with the locking member on reassembly and readily transmit an inwardly rolling or tumbling action to the member.

FIG. 5 illustrates another embodiment of the present invention having a modified tongue portion 55. Two passageways 59 and 59a may enter the groove portion 53 on opposite sides of shank 51 and align with two other passageways 60 and 60a which continue into the tongue portion 55 to a location short of the center thereof or of intersection leaving a central portion 57 of the tongue portion undisturbed. The length of each passageway penetrating the tongue portion may appropriately be less than one-half a detent or locking members diameter, and similar to the foregoing embodiments the passageway height or diameter within the tongue portion may be less than the diameter of a locking member, such that the tongue portion edges may strike the locking members in a skewed or off centered manner as described to produce outwardly transverse forces for unlatching the joint.

The modification shown in FIG. 5 is especially useful where a tongue portion having a thickness exceeding the diameter of a detent member is desired for increased strength of the tongue and groove type joint. Although the detent members may be restrained from full entry into the tongue portion of the passageway by constricting the openings thereof, the central portion 57 of the tongue which interrupts the passageway may add strength to the joint. As a further modification, the central portion 57 of tongue portion 55 may include a spring or resilient material (not shown) which may be compressed by the locking member occupying the latched position. On release of the locking members, the recoil of the spring or resilient material may initiate outward movement of the locking members towards the unlatched position. In yet another modification of the FIG. 5 embodiment, only one locking member may be used by providing only one of the two passageways 59 and 59a which may further add strength to the joint.

Other embodiments of the present invention may include a joint having other than two locking members. Three or more locking members may be inserted into a radial pattern of passageways to provide a stronger latch but, multiple passageways may impair the joint strength. Such a radial array of locking members may be used as ball bearings supporting a rotating shank or shaft by providing sufficient clearance between the shank sections and the retaining collar. Furthermore, special problems and uses may be met by arranging a set of locking members having various shapes and sizes into suitably shaped and sized passageways.

It will be seen that the present invention provides a coupling which may be quickly and easily uncoupled and reassembled. Furthermore torque and longitudinal force may be transmitted through the coupling with a minimized possibility of damage to the locking or detent members. Uncoupling of the joint is accompanied with spring recoil which makes the device especially suitable as an impact means release.

It will be understood that various changes may be made in the details and arrangement of the parts described herein by those skilled in the art within the scope of the invention expressed in the claims.

What is claimed is:

1. A device of the class described comprising the combination of a pair of longitudinally aligned and longitudinally separable members each having an end portion normally overlapping the other and each provided at its end portion with a bore laterally extending between oppositely disposed external surfaces of said end portions normally in alignment with the bore of the other, at least one of said overlapping portions having a noncircular tongue portion abutting a groove portion on the other overlapping portion to maintain the longitudinally aligned members against rotation of one with respect to the other said bores passing through said tongue and groove portions, a locking means including a pair of spheres each having a diameter about equal to one-half the total length of said bores and about equal to but slightly less than the diameter of said bore through at least said groove portion to provide a close fit between said bores and said spheres said means having portions disposed in each of said bores for maintaining the pair of members against longitudinal separation, a collar having a retaining portion overlying at least one of said bores to retain the locking means in locking disposition in both of said bores, yieldable means normally maintaining the retaining portion of said collar in said overlying relationship, and means for effecting relative movement between said longitudinally aligned members and said collar to move the retaining portion of the latter out of registry with the bores and thereby free said locking means for separation of the longitudinally aligned members.

2. The device according to claim 1 wherein one of said longitudinally aligned members is provided with a laterally projecting shoulder and said yieldable means is disposed under compression intermediate said shoulder and said collar whereby on movement of said locking means out of locking disposition in said bores the shouldered longitudinally aligned member is freed for propulsion away from said other longitudinally aligned member, said device including a housing member normally enclosing said collar and said shouldered aligned member with said locking means, and said housing member is provided with a laterally extending mounting flange.

3. The device according to claim 2 wherein said yieldable means is normally relaxed and is compressed by said relative movement between said longitudinally aligned members and said collar.

References Cited

UNITED STATES PATENTS 3,052,940  9/1962  Sellers.
3,302,960  2/1967  Herrmann.

FOREIGN PATENTS 1,094,553  5/1955  France.

FRED C. MATTERN, Jr., Primary Examiner
F. D. SHOEMAKER, Assistant Examiner

U.S. Cl. X.R.

24—211, 230; 74—527; 85—5; 287—119